United States Patent [19]

Ballendux

[11] 4,132,133
[45] Jan. 2, 1979

[54] AUXILIARY TRANSMISSION

[75] Inventor: Gerardus M. Ballendux, Waukesha, Wis.

[73] Assignee: Allis-Chalmers Corporation, Milwaukee, Wis.

[21] Appl. No.: 752,687

[22] Filed: Dec. 20, 1976

[51] Int. Cl.² .............................................. F16H 3/02
[52] U.S. Cl. ....................................................... 74/745
[58] Field of Search .................. 74/331, 745, 359, 357, 74/15.86

[56] References Cited

U.S. PATENT DOCUMENTS 3,991,634  11/1976  Longshore ............................ 74/745
4,023,418   5/1977  Zenker ................................... 74/745

Primary Examiner—Benjamin W. Wyche
Assistant Examiner—Frank H. McKenzie, Jr.
Attorney, Agent, or Firm—Arthur L. Nelson

[57] ABSTRACT

An auxiliary transmission having a three-clutch input operating through selective multiple countershafts including a carrier supporting the countershafts angularly spaced around the output shaft which is rotatably supported centrally within the carrier. The auxiliary transmission multiplies the speed ratios of the main transmission to multiply the overall power train speed ratios and/or provide forward and reverse power shifting for the gear train as so desired.

10 Claims, 5 Drawing Figures

AUXILIARY TRANSMISSION

This invention relates to a transmission and more particularly to an auxiliary transmission with an over, under, and direct drive through a countershaft carrier having multiple countershafts to multiply the speed ratios of the main transmission and the overall gear train of the vehicle.

The modern farm and industrial tractor employs multiple speed transmissions to provide the proper speed ratios of the transmission to adapt the speed of the tractor to the desired working range of the implement. The conventional main transmission is usually provided with a manual shifting mechanism to shift the transmission from one speed ratio to the other. While these speed ratios are satisfactory for many operations, the use of a power shift auxiliary transmission ahead of the main transmission provides a means for shifting "on to go", to shift up or shift down or provide a direct drive through the transmission to accommodate changing torque requirements of the tractor for the particular operation. Accordingly, this invention provides for a three-speed forward power shift auxiliary transmission in which a multiple countershaft carrier is used to adapt the speed ranges of the power train to the speeds required for the tractor. The carrier comprises a unit mounted in the auxiliary transmission which provides the forward speed ratios necessary in the auxiliary transmission as well as providing an optional carrier with a reverse speed ratio and two forward speeds adapting the tractor for special operations. The countershaft carrier with reverse pinions is driven by the multiple countershafts to provide two speeds forward and a reverse to increase the versatility of the tractor by providing options not normally provided in a tractor of this type.

It is an object of this invention to provide a multiple-speed auxiliary power shaft transmission to multiply the main transmission speeds for selective two forward speeds and one reverse or three forward speeds by interchanging a countershaft carrier having a plurality of countershaft gearsets.

It is another object of this invention to provide an auxiliary transmission having a multple clutch carrier and a countershaft carrier with multiple countershaft output to multiply the main transmission speed ratios to increase the speed ratio of the overall power train including the auxiliary and main transmission.

It is another object of this invention to provide an auxiliary transmission with an interchangeable carrier having multiple countershaft gearsets to provide forward or forward and reverse speeds through the main transmission to increase the speed ratios of the power train on the tractor and provide on-the-go shifting in the power shift speed ratios.

It is a further object of this invention to provide an auxiliary transmission having a countershaft carrier with a plurality of countershafts angularly spaced around the output shaft of the auxiliary transmission to provide balanced forces on the output shaft similar to a planetary carrier, and the carrier provides support for the centrally mounted output shaft and the pinion gears of the countershaft gearsets with selective options for the forward speeds and reverse of the transmission.

The objects of this invention are accomplished by providing a main transmission on the vehicle and an auxiliary power shift transmission driving into the main transmission. The main transmission may be manually shiftable to provide a selected number of speed ratios on the tractor. The auxiliary transmission has multiple forward speeds and may be provided with a reverse speed with a power shifting arrangement for shifting on the go. The provision with three forward speeds in a countershaft carrier will permit up shifting, down shifting and direct drive from the engine to the main transmission to vary to ground speeds of the tractor, and an option countershaft carrier for substituting a reverse speed through the countershaft carrier together with two forward speeds. The optional countershaft carrier is interchangeable as original equipment or a field option as desired by the owner.

The preferred embodiments of this invention are illustrated in the drawings wherein.

Figure 1:
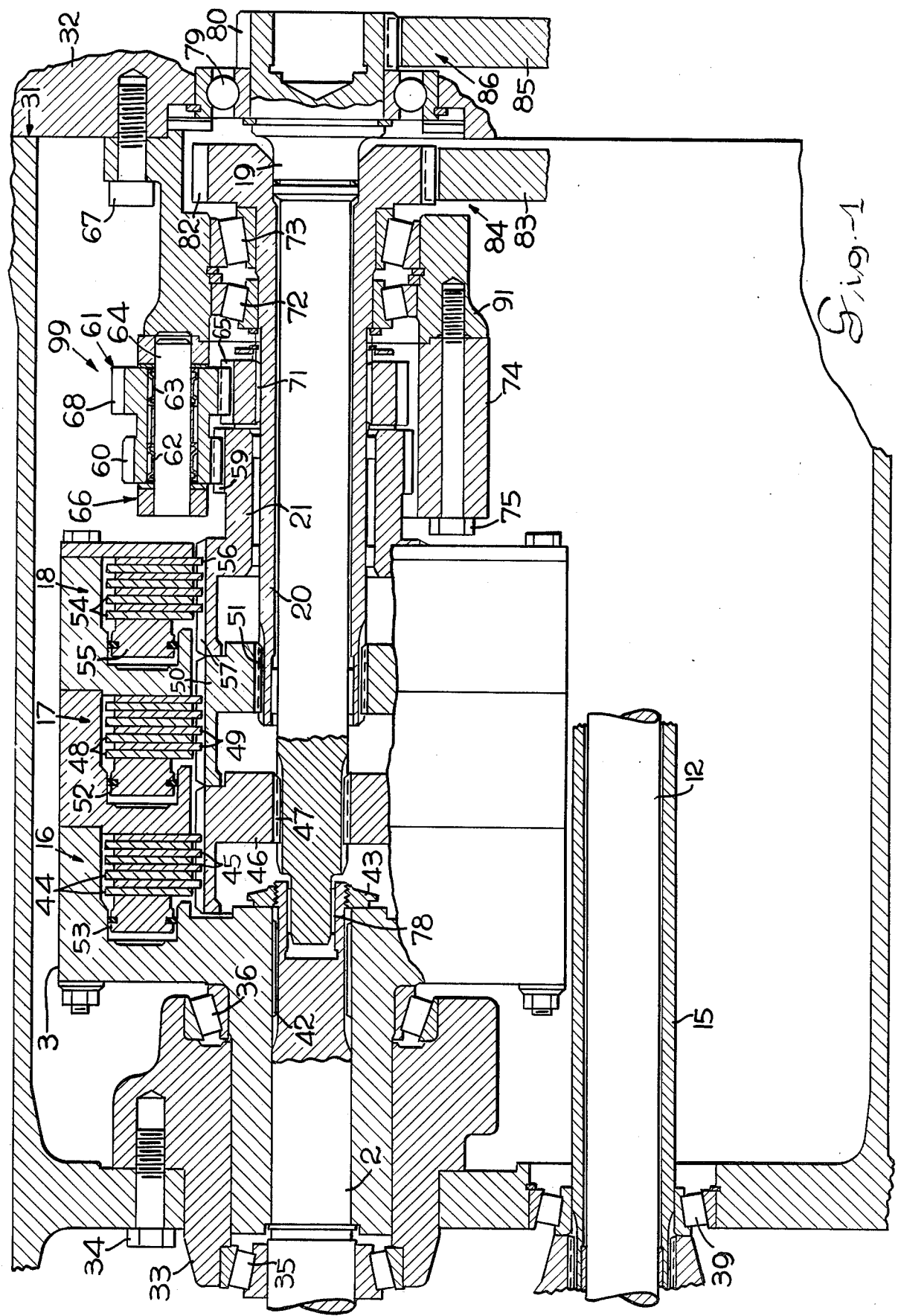
FIG. 1 illustrates a cross-section view of the auxiliary transmission providing three speeds forward.
Figure 4:
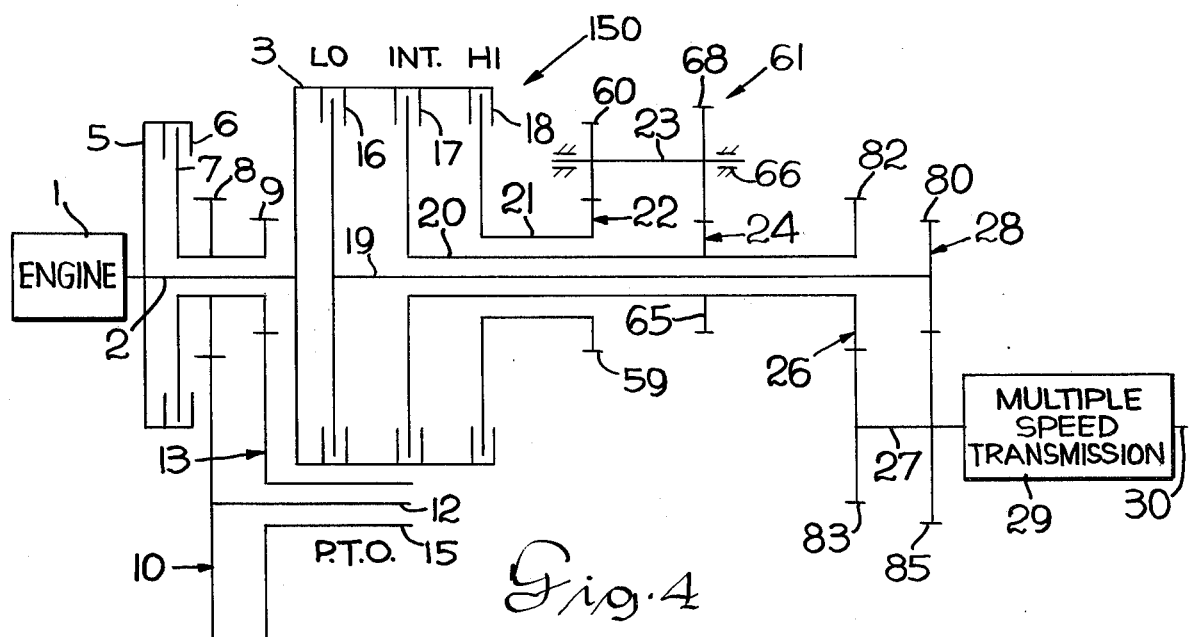
FIG. 4 is a schematic diagram of the transmission shown in FIG. 1.

FIGS. 1 and 4 shown the embodiment providing three forward speeds of the auxiliary transmission. The engine 1 drives through the input shaft 2 which is directly coupled to the clutch carrier 3. A power take-off clutch 6 is provided on the clutch drum 5. The clutch 6 selectively engages through the clutch hub 7 to drive the gears 8 and 9. Gear 8 is the driving gear for the countershaft gearset 10 driving the driven gear 11 and the PTO shaft 12. The countershaft gearset 13 includes the driving gear 9 and the driven gear 14 which drives the PTO guill shaft 15.

The input shaft 2 is connected to the clutch carrier 3 which rotates about a common axis with the input shaft 2. The clutch carrier 3 carries the clutches 16, 17 and 18. The clutch 16 drives the driven shaft 19 when engaged. The clutch 17 drives the quill shaft 20 when engaged and the clutch 18 drives the sleeve 21 when engaged. The sleeve 21 drives into the gearset 22 and countershaft 23 which in turn drives through the gearset 24 to the quill shaft 20. The quill shaft 20 drives through the gearset 26 to the shaft 27. The output shaft 19 drives directly to the gearset 28 to the shaft 27 which in turn drives into the multiple speed transmission 29. The shaft 30 drives final drive assembly or may drive through a range transmission.

Referring to FIG. 1 a cross-section view of the transmission is shown. The transmission housing 31 is shown with end plate 32 bolted on the end of the transmission housing. Bearing retainer 33 is mounted on the opposite end of the transmission housing 31 and fastened by means of a plurality of bolts of which bolt 34 is shown. The bearing retainer 33 carries the bearings 35 and 36. Bearing 35 rotatably supports the shaft 37 which is supported by another bearing external of the portion of the transmission, as shown in FIG. 1. Bearing 36 rotatably supports the clutch carrier 3. Bearing 39 rotatably supports the PTO quill shaft 15 while the PTO shaft 12 is rotatably supported by a bearing external of the portion of the transmission shown in FIG. 1. The PTO shafts provide two-speed PTO output from the transmission.

The clutch carrier 3 is connected to the input shaft 2 by a spline connection 42 and fastened by a nut 43 of the end of the shaft. The clutch 16 includes clutch discs 44 connected to the clutch carrier 3 while clutch discs 45 are connected through a spline connection to a clutch hub 46. The clutch hub 46 is connected by a spline connection 47 to the driven shaft 19.

Similarly the clutch 17 is formed with clutch discs 48 connected to the clutch carrier 3 while the clutch discs 49 are connected through a spline connection to a clutch hub 50. The clutch hub 50 is connected by a spline connection 51 to the quill shaft 20. Hydraulic actuator 52 actuates clutch 17 and hydraulic actuator 53 operates the clutch 16. Hydraulic actuator 55 operates the clutch 18. Clutch 18 includes the clutch discs 54 which are connected to the clutch carrier 3 while the clutch discs 56 are connected by the spline connection 57 to the sleeve 21.

The sleeve 21 is formed with the gear 59 which engages the pinion gear 60. Pinion gear 60 is a portion of a cluster gear 61 which is rotatably supported on the bearings 62 and 63. Shaft 64 rotatably supports the cluster gear 61. Three cluster gears are equally angularly spaced in the carrier 66. The carrier 66 is bolted by the bolts 75 through bearing support 91 to the end plate 32.

The gear 68 of the cluster gear 61 drives the gear 65 which is connected by spline connection 71 to the quill shaft 20. A quill shaft 20 is rotatably mounted on the bearings 72 and 73 which are embraced by the bearing support 91. The carrier 66 is formed with the sides supporting shaft 64 and is bolted by a plurality of bolts 75 to the bearing retainer 91. The driven shaft 19 is rotatably mounted in the bearing 79 in the end plate 32 and in bearing 78 inside shaft 37. The shaft 19 forms the gear 80 at the end of the shaft. The gear 82 on the end of quill shaft 20 drives into the gear 83 of the countershaft gearset 84. The gear 80 drives into the gear 85 of the countershaft gearset 86.

Figure 2:
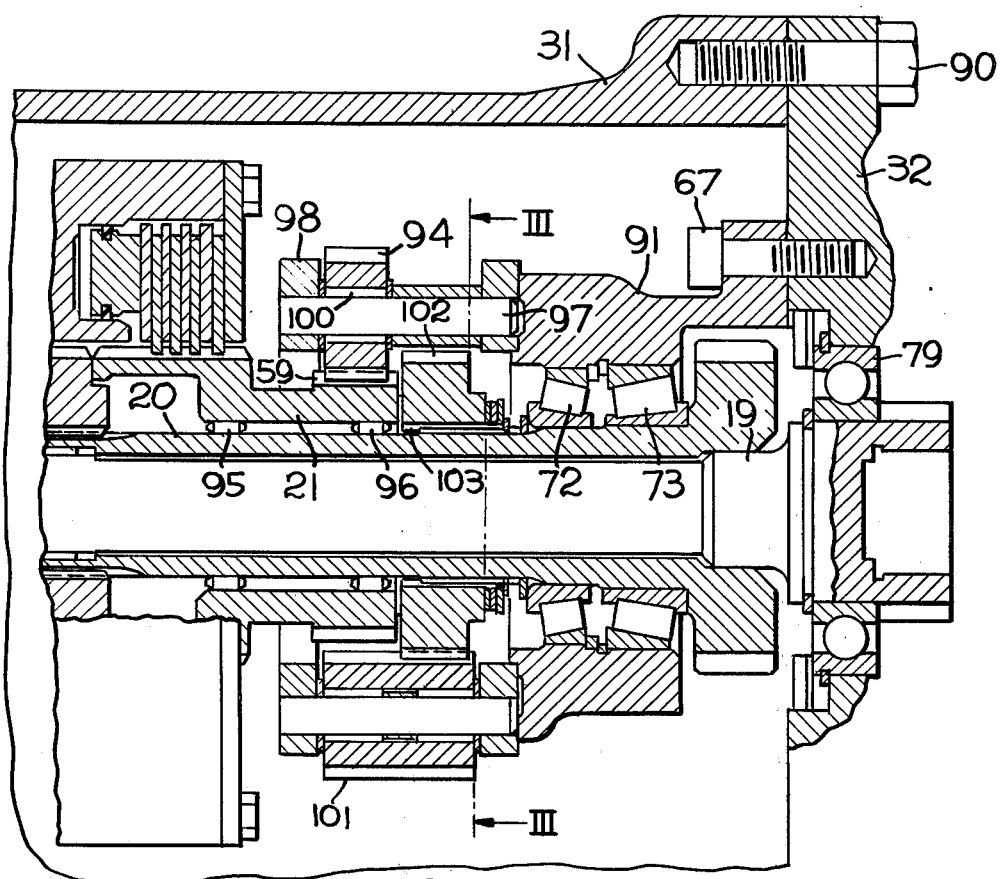
FIG. 2 illustrates a cross-section view of the porton of the auxiliary transmission showing the carrier for use in combination with the three-speed clutch as shown in FIG. 1 to provide two speeds forward and a reverse.
Figure 3:
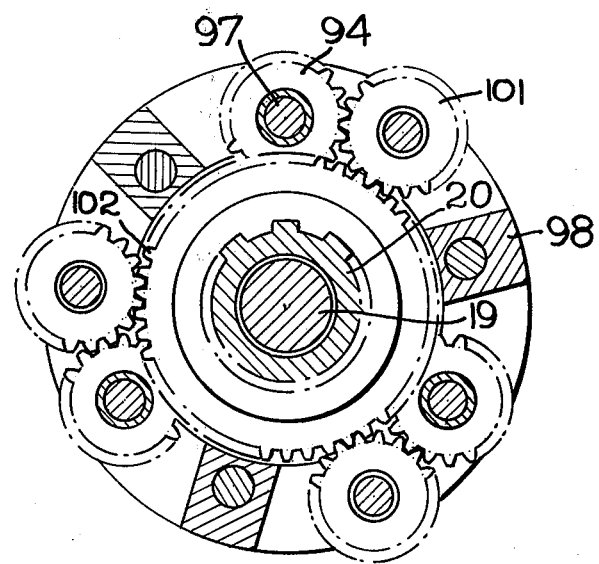
FIG. 3 is a cross-section view taken on line III-III of FIG. 2.
Figure 5:
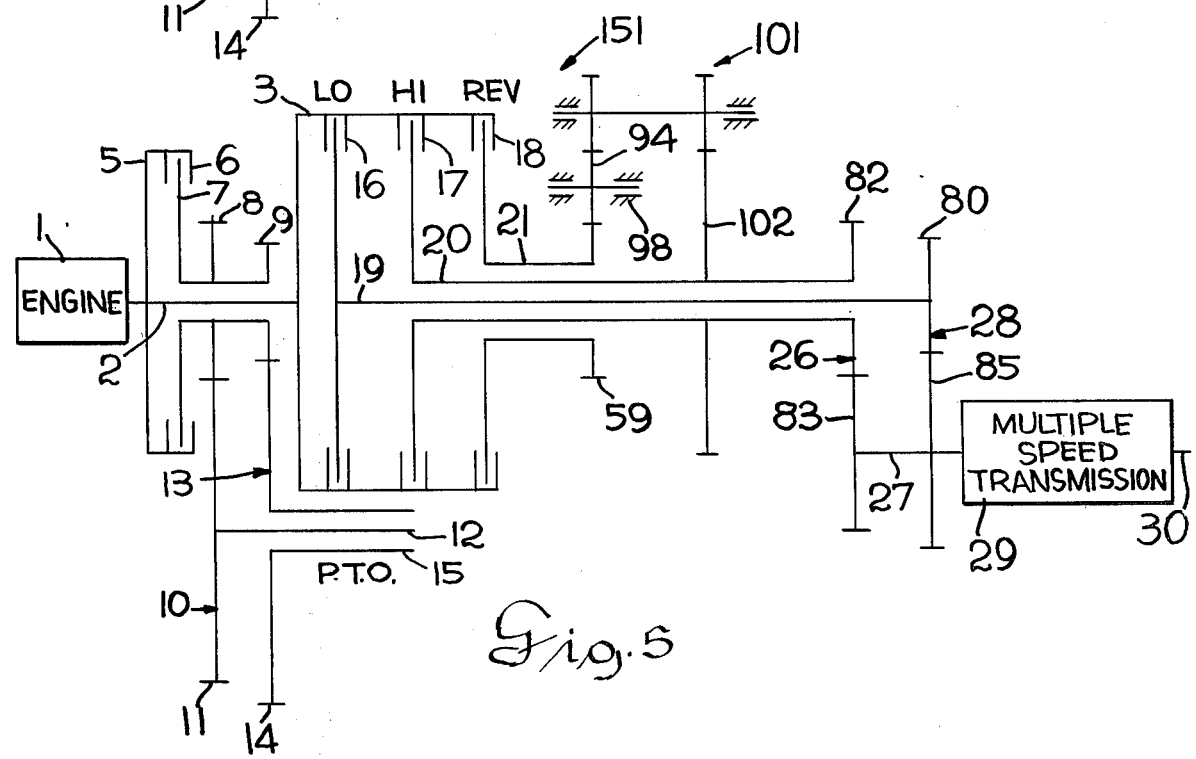
FIG. 5 is a schematic diagram of the auxiliary transmission shown in FIG. 2.

Referring to FIGS. 2, 3 and 5 a modification of the auxiliary transmission is illustrated. The modification shown provides two speeds forward and one reverse for the auxiliary transmission. The auxiliary transmission shown on these views is constructed to replace the transmission shown on FIGS. 1 and 4 and provides the operator of the vehicle with an option having two speeds forward and one reverse or having a transmission with power shifting with three forward speeds as shown in FIG. 1.

Referring to FIG. 5 the engine 1 drives into the input shaft 2 to the clutch carrier 3 carrying the clutches 16, 17 and 18. The drive may be selectively directed through the driven shaft 19, quill shaft 20 or sleeve 21. Power may also be transmitted through the PTO clutch 6 to the PTO shafts 15 or 12, as previously described with reference to FIG. 4. The output of the transmission drives through the gearsets 26 and 28 as previously described. The modification, however, primarily lies in the carrier and the countershaft gearsets associated with the carrier. A reverse pinion gear 94 rotatably mounted in the carrier 98 drives through the cluster gear 101 which is also mounted in the carrier. The reverse pinion gear 94 drives the cluster gear 101 which drives through the gear 102 connected to the quill shaft 20. The reverse gear 94 provides the reverse speed in the auxiliary transmission as contrasted to speed reduction, as provided in the original embodiment of FIG. 1. FIGS. 2 and 3 show the carrier modifications, as shown in FIG. 5, which are adapted to operate with the triple clutch input, as shown in FIG. 1.

The housing 31 and end plate 32 are shown bolted together by the bolts 90 of which one is shown. The bearing support 91 supports the bearings 72 and 73 which rotatably support the shaft 20. The bearing 79 and the end plate 32 rotatably support the shaft 19. The bearings 95 and 96 rotatably support the sleeve 21. The shaft 97 is mounted in the carrier 98 which supports bearing 100 and the gear 94. The gear 94 engages the cluster gear 101 which extends to axially engage the gear 102. The gear 102 is connected by the spline connection 103 to the quill shaft 20. The drive between the gear 59 and the reverse pinion gear 94 and cluster gear 101 and gear 102 is also shown in the end view in FIG. 3. This arrangement of the carrier 98 used in FIG. 2 provides a modification of the carrier 66 of FIG. 1 for reverse drive in the third gear range in the auxiliary transmission. The carrier supports a plurality of countershaft gearsets which changes the speed ratio and the direction of the output drive of the auxiliary transmission.

The operation of this device will be described in the following paragraphs.

The engine 1 drives the input shaft 2 and power shift transmission. The two PTO shafts 15 and 12 may be selectively engaged through the clutch 6. The input shaft 2 drives directly to the clutch carrier 3. The clutch carrier 3 carries clutches 16, 17 and 18 which can be selectively engaged to transmit power through a driven shaft 19, a quill shaft 20, or the sleeve 21. As viewed in FIG. 4, the low speed drive is through the output shaft 19 and the gearset 28 and then to the input of the multiple speed transmission 29. The intermediate speed for the auxiliary transmission is through the clutch 17 and quill shaft 20 and countershaft gearset 26 to the input of the multiple speed transmission 29. The high speed for the auxiliary transmission is provided through the clutch 18, sleeve 21 and the countershaft gearsets 23 and return drive to the quill shaft 20 and the countershaft gearsets 26 which drive into the multiple speed transmission 29.

FIG. 5 illustrates a modification of the auxiliary transmission in which the clutch 18 and sleeve 21 drive into a reverse pinion gear 94 and cluster gear 101 and the return drive is through gear 102 to the quill shaft 20. The quill shaft 20 drives through a countershaft gearset 26 to the multiple speed transmission 29. The reverse pinion gear 94 provides the reverse option in the carrier as compared to the high speed drive of the first embodiment of this invention.

It is noted, however, that the carriers are adaptable to use in the auxiliary transmission to selectively provide a high speed output from transmission 150 or a reverse output from the auxiliary transmission 151. The first two speeds of both transmissions remain the same and they are forward speeds. The third speed, however, has been modified to provide a reverse direction to give the option to the owner of the vehicle of two speeds forward and one reverse to provide greater versatility of the tractor depending on the type of work required of the tractor.

While the auxiliary transmission provides the option of a low, intermediate, and high speeds or low, high and reverse speeds, the power take-off option remains the same. The power take-off is a high-low option 540 or 1,000 r.p.m. The auxiliary transmission is a power shift transmission with shifting "on the go" which can vary the ground speed of the tractor with a relatively constant speed of operation of the implement. The multiple speed transmission may be any suitable transmission having the desired number of speed ratios required. The auxiliary transmission multiplies the total number of speed ratios in the multiple speed transmission to increase the speed ratios of the overall power train, provide versatility, and provide "on-the-go" shifting normally not capable of a conventional type transmission.

The embodiments of the invention in which an exclusive property or privilege is claimed are defined as follows:

1. An auxiliary transmission for use in a tractor drive train comprising, a transmission housing, an input shaft connected to a clutch carrier rotatably supported in said transmission housing for rotation about a common axis, a driven shaft mounted for rotation about said common axis, a quill shaft receiving said driven shaft mounted for rotation about said common axis, a sleeve for receiving said quill shaft mounted for rotation about said common axis and defining a driving gear, a plurality of clutches mounted on said clutch carrier, a friction member slidably connected to said driven shaft included in a first of said clutches and permitting disconnection of said driven shaft from said first of said clutches, a second friction member in a second of said clutches slidably connected to said quill shaft permitting slidable disconnection of said quill shaft from said second friction member, a third friction member included in a third of said clutches slidably connected to said sleeve for selective and alternative drive from said input shaft to said quill shaft and slidable disconnection of said sleeve from said third friction member, an interchangeable countershaft gearset carrier including fastening means removably mounting said carrier on said transmission housing and permitting said interchangeable countershaft gearset carrier and said shafts and sleeve to be slidably removed from said transmission housing, a driven gear on said quill shaft rotatably mounted in said countershaft gearset carrier for rotation on said comon axis, a plurality of countershaft gearsets angularly spaced and mounted in said countershaft gearset carrier in driving engagement between said driving gear of said sleeve and said driven gear of said quill shaft, a main transmission, a pair of jack shaft gearsets for selectively and alternatively driving from said driven shaft and said quill shaft for providing selective multiple speed drive to said main transmission in response to actuation of one of said clutches on said clutch carrier.

2. An auxiliary transmission for use in a tractor drive train as set forth in claim 1 wherein said countershaft carrier includes means defining three countershaft gearsets for drive from said sleeve to said quill shaft.

3. An auxiliary transmission for use in a tractor drive train, as set forth in claim 1, wherein said countershaft carrier includes a plurality of reverse pinion gears angularly spaced and rotatably mounted in said carrier, means mounting said reverse pinion gears for driving from said countershaft gearsets for providing a reverse drive in said tractor drive train.

4. An auxiliary transmission for use in a tractor drive train, as set forth in claim 1, wherein said countershaft gearsets in said carrier include cluster gears in each of said gearset.

5. An auxiliary transmission for use in a tractor drive train, as set forth in claim 1, including a plurality of reverse pinion gears, said countershaft gearsets include a cluster gear driven by said reverse pinion gear and driving said gear on said output quill shaft.

6. An auxiliary transmission for use in a tractor drive train, as set forth in claim 1, wherein said sleeve defines a clutch hub a gear on said clutch hub driving into each of said countershaft gearsets, said plurality of countershaft gearsets define three countershaft gearsets to provide balanced power transmission through said countershaft carrier.

7. An auxiliary transmission for use in a tractor drive train, as set forth in claim 1, including a power take-off clutch connected to said input shaft, a clutch hub in said power take-off clutch connected to two countershaft gearsets for driving two PTO shafts, said power take-off clutch selectively providing drive through either of said countershaft gearsets to provide two-speed output from said power take-off shafts.

8. An auxiliary transmission for use in a tractor drive train, as set forth in claim 1, wherein said sleeve includes a clutch hub portion for connection to one of said clutches in said clutch carrier, a gear porton for driving each of said plurality of countershafts gearsets.

9. An auxiliary transmission for use in a tractor drive train, as set forth in claim 1, wherein said countershaft carrier includes a bearing support rotatably supporting said quill shaft.

10. An auxiliary transmission for use in a tractor drive train, as set forth in claim 1, including a reverse pinion gear rotatably mounted in said carrier, said sleeve includes a drive gear engaging said reverse pinion gear, said countershaft gearset includes a cluster gear driven by said reverse pinion gear and for driving said gear on said quill shaft for providing reverse drive of said auxiliary transmission.

* * * * *